Oct. 10, 1967   J. S. OLEJNICZAK   3,346,033
APPARATUS FOR STRIPPING LIQUIDS
Filed Feb. 21, 1966   2 Sheets-Sheet 2

JERZY STANISLAW OLEJNICZAK,
INVENTOR

BY Hall & Hughes
ATTORNEY

# United States Patent Office 3,346,033
Patented Oct. 10, 1967

3,346,033
APPARATUS FOR STRIPPING LIQUIDS
Jerzy Stanislaw Olejniczak, Gossops Green, Crawley, Sussex, England, assignor to Edwards High Vacuum International Limited, Crawley, Sussex, England, a British company
Filed Feb. 21, 1966, Ser. No. 528,909
Claims priority, application Great Britain, Feb. 23, 1965, 7,812/65
8 Claims. (Cl. 159—4)

ABSTRACT OF THE DISCLOSURE

An apparatus for stripping liquids including an evacuable chamber in which the liquid is applied to one surface of a porous member through which stripping vapor is caused to pass, the liquid draining from the porous member to an outlet. The porous member forms part of the limiting wall of a hollow evaporator which may be rotatable, the stripping vapor passing from the inside of the evaporator through the porous member.

---

This invention relates to methods of an apparatus for stripping liquids.

The term stripping of liquids refers to the removal of a gas or a volatile liquid from solution in a less volatile liquid by the agency of temperature and pressure. The concentration of the vapour or gas to be removed by stripping will be greatest in the bulk of the liquid subjected to stripping and lowest in the gas phase maintained under vacuum. The concentration of the dissolved gas or vapor at the vapor-liquid interphase will be intermediate between the two and dependent on the relative efficiencies of the mass transfer coefficients controlling the mass transfer within the liquid and gas phases. In vacuum, especially when partial pressures are low, liquid surface effects affecting the mass transfer may be present and the extent of these effects on mass transfer should then be considered. To improve the mass transfer coefficients in the liquid phase, steam is often injected directly into the liquid in the process vessel.

According to the present invention, a method of continuously stripping liquids comprises applying the liquid to one face of a vapor permeable porous member which is impervious to the liquid and applying a vapor stream to the opposite face of the supporting surface in such a manner that turbulence is produced in the liquid on that surface.

In a preferred method according to the invention, the supporting surface is rotated while under vacuum at a speed such that the liquid is caused to flow over it in the form of a thin film.

Apparatus for carrying out the invention comprises an evacuable chamber having mounted therein a stripping surface constituted by a first opposed surface of a vapor permeable porous member impervious in use to the liquid and having said first and a second opposed surface, the apparatus further being provided with a vapor inlet duct situated in the region of said second opposed surface, a liquid inlet duct constructed and adapted to convey said liquid to said first opposed surface, and a liquid outlet duct from said chamber located in intercepting relationship with stripped liquid which drains from said first opposed surface.

Normally the stripping vapour is steam, but any other suitable vapour such as alcohol may be used.

Figure 1:
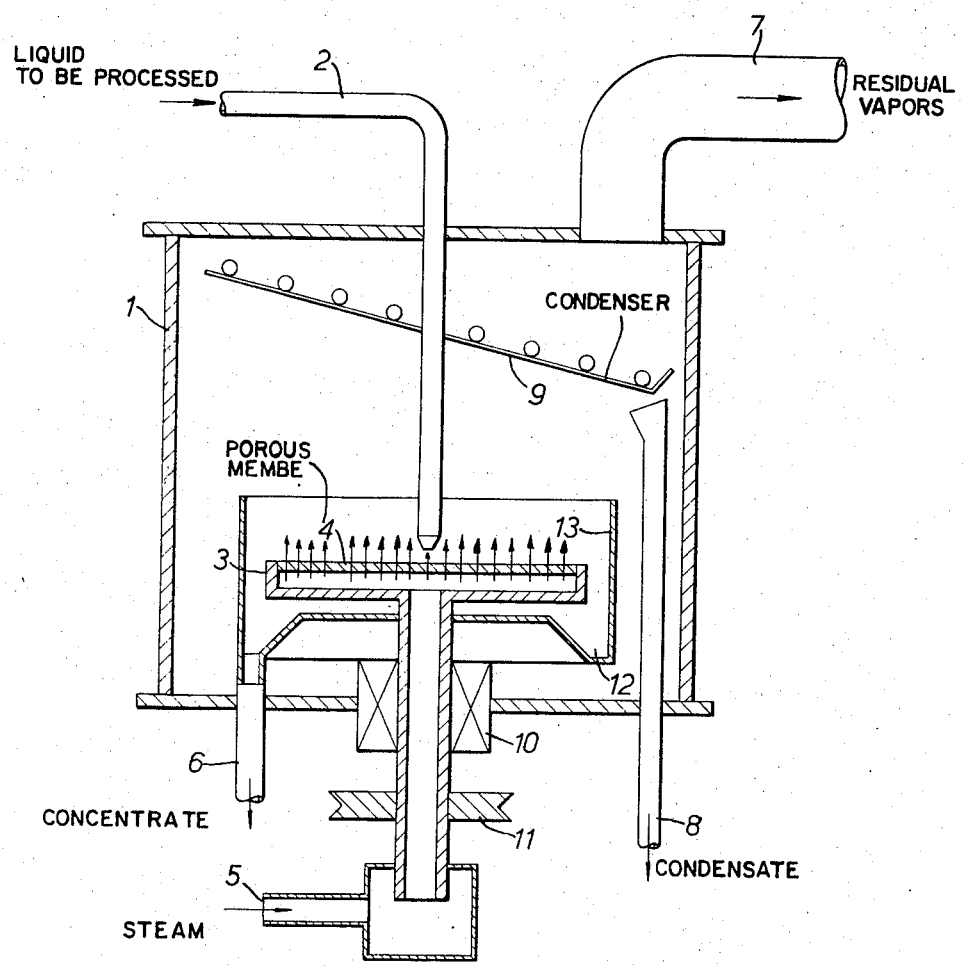
Figure 2:
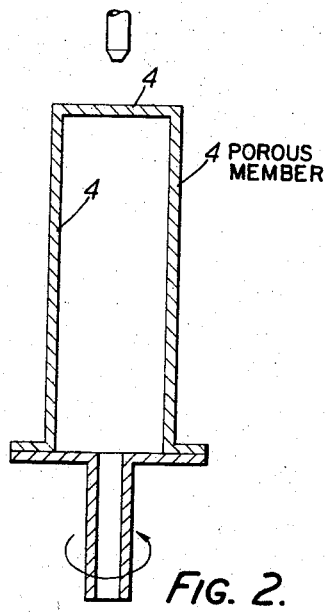

One form of apparatus for carrying out the invention will now be described in greater detail by way of example, with reference to the accompanying drawings in which:

FIGURE 1 shows a diagrammatic sectional representation of the apparatus; and
FIGURES 2 to 5 show alternative constructional forms which the porous member may take.

Referring to FIGURE 1, a vacuum chamber 1 contains an evaporator assembly 3 carrying a porous disc 4. The assembly 3 is rotatable by means of a belt passing round a pulley 11 and has a bearing and sealing arrangement 10 mounted in the lower wall of the vacuum chamber 1. A pipeline 5 permits steam to enter the assembly 3 and to pass through the porous disc 4, and a pipeline 2 supplies liquid to be processed to the upper surface of the disc 4. The vacuum chamber 1 is evacuated by a pump connected to the chamber 1 by a line 7. The pump acts continuously removing any vapour so as to retain a low working pressure which could range down to about $10^{-3}$ torr. A condenser 9 drains to an outlet pipe 8 and the processed liquid is removed via an outlet 6.

In operation the assembly 3 is rotated and the liquid to be processed is applied to the porous disc 4. The rotational movement of the disc 4 causes the liquid to spread over the disc in a thin film moving from the centre to the edge. The liquid is then thrown into a trough 12 of an open topped container 13 in which the assembly 3 is situated. Meanwhile steam is passing through the porous disc 4 and bubbling through the film of liquid. This increases the turbulence of the film already set up by the nature of the surface of the disc 4. The heat from the steam provides latent heat of evaporation for the constituents to be removed from the liquid and the passing of the steam through the liquid effects physical separation of certain components. The liquid spends only a matter of seconds or even a fraction of a second on the disc 4 depending upon the speed of rotation, and the film thickness must be such as to produce in the film a hydrostatic pressure negligible compared with that in the vacuum chamber 1. The film thickness is thus of the order of a few thousandths of an inch.

After passing through the liquid film, the steam and any condensable vapours are cooled on the condenser 9 and removed by pipe 8. Any residual vapours are removed via line 7 by a vacuum unit, which may be of any kind as long as it is capable of handling the vapours removed from the processed liquid and of maintaining the required pressure in the chamber 1.

Figure 4:
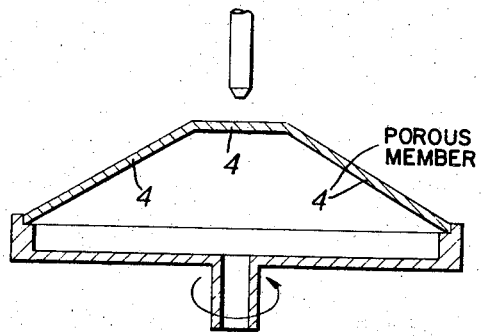
Figure 3:
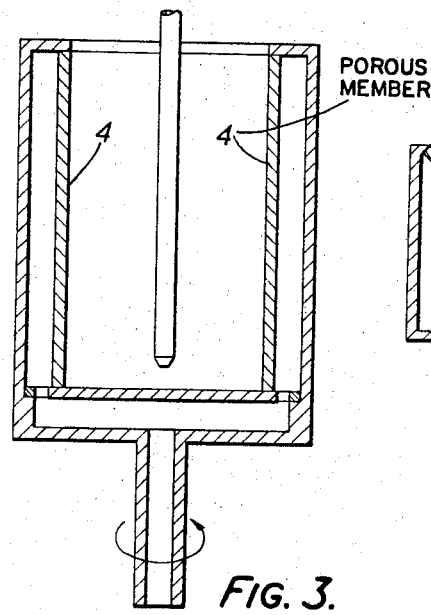
Figure 5:
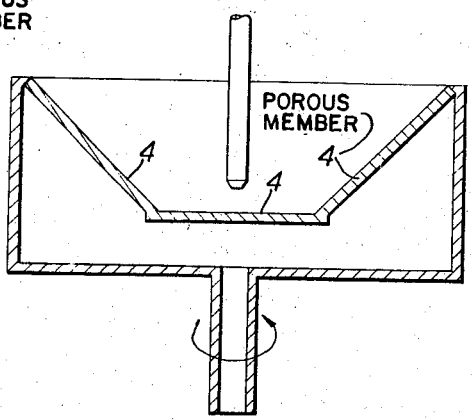

FIGURES 2 to 5 show alternative construction of evaporator assembly in which the numeral 4 indicates in each case the porous surface upon which the process takes place. For normal purposes the arrangements shown in FIGURES 3 and 5 are preferred as the liquid film tends to be held more firmly to the surfaces 4 due to the centrifugal forces.

In certain cases when the need for thin films is not essential the porous surface could be static. In these cases the quantity of liquid on the porous surface would substantially increase even though an arrangement such as is shown in FIGURE 4 were used. The passage of the vapour or steam in the preferred embodiment would then produce a more violent action causing a certain amount of splashing. The process time would also be increased.

The evaporator assemblies need not be orientated as shown in the drawings and they may in fact be disposed at any desired angle or may be inverted, because the centrifugal forces on the liquid film are large compared with gravitational forces.

To assist in the evaporation of contaminants it is sometimes desirable to heat the liquid to be processed. This can be effected either by heating the liquid directly, for example by supporting a radiant heater within the vacuum chamber, or indirectly by heating the porous member.

I claim:
1. Apparatus for continuously stripping a liquid by conveying said liquid to a stripping surface from which it subsequently drains, comprising an evacuable chamber having mounted therein a hollow evaporator assembly rotatable about an axis and comprising a vapor permeable porous member impervious in use to said liquid and said member having a first surface, an opposite surface, and said evaporator assembly having a vapor inlet situated in the region of said opposite surface, said apparatus further being provided with:
   (a) a liquid introduction duct constructed and adapted to convey said liquid to said first surface which constitutes the stripping surface,
   (b) a liquid outlet duct from said chamber located in intercepting relationship with stripped liquid draining from said first surface, and
   (c) an outlet duct from said chamber for the removal of gases and vapors arising due to the stripping of said liquid.

2. Apparatus according to claim 1 in which said chamber has mounted therein a vapor condenser and is further provided with a condensate outlet duct.

3. Apparatus for continuously stripping a liquid by conveying said liquid to a stripping surface from which it subsequently drains, comprising an evacuable chamber having mounted therein a hollow symmetrical evaporator assembly rotatable about its axis of symmetry, said assembly comprising in part at least a limiting wall constituted by a vapor permeable porous member which is impervious in use to said liquid, said wall having an exterior surface and an internal surface with respect to said evaporator assembly, said apparatus further comprising:
   (a) a vapor inlet communicating with the interior of said hollow evaporator assembly,
   (b) a liquid inlet duct positioned adjacent said axis of rotation and constructed to convey said liquid to said exterior surface, the latter comprising the stripping surface,
   (c) a liquid outlet duct from said chamber located in intercepting relationship with stripped liquid draining from said exterior surface over which said liquid flows in the form of a thin film, and
   (d) an outlet duct from said chamber for the removal of gases and vapours arising due to the stripping of said liquid.

4. Apparatus according to claim 3 in which said porous member is in the form of a disc.

5. Apparatus according to claim 3 in which said porous member is in the form of a hollow cylinder of which one base and the lateral sides are porous.

6. Apparatus according to claim 3 in which said porous member is in the form of a hollow cylinder and said internal surface is an outer surface of said cylinder.

7. Apparatus according to claim 3 in which said porous member is in the form of a hollow frusto-cone of which one base and the lateral sides are porous.

8. Apparatus according to claim 3 in which said chamber has mounted therein vapor condensing means and is further provided with a condensate outlet duct.

References Cited
UNITED STATES PATENTS

| | | | |
|---|---|---|---|
| 1,289,779 | 12/1918 | Howard | 159—4 X |
| 1,398,735 | 11/1921 | MacLachlan | 99—203 |
| 1,691,827 | 11/1928 | Schuckher | 261—88 |
| 1,960,608 | 5/1934 | Weber et al. | 208—81 |
| 2,657,745 | 11/1953 | Bleecker | 158—77 |
| 2,658,863 | 11/1953 | Guala | 202—40 |
| 2,699,822 | 1/1955 | Jehlicka | 159—4 |
| 2,884,999 | 5/1959 | Lubin et al. | 159—47 |
| 2,973,189 | 2/1961 | Chin Chu | 196—46 X |
| 2,990,011 | 6/1961 | Stratford | 159—4 |
| 3,163,587 | 12/1964 | Champe | 202—176 |
| 3,201,327 | 8/1965 | Beck | 261—117 X |
| 3,248,305 | 4/1966 | Williamson | 203—26 X |

NORMAN YUDKOFF, *Primary Examiner.*

J. SOFER, *Assistant Examiner.*